Sept. 7, 1926.

R. SATO 1,599,290

WALKING TOY

Filed April 30, 1923　　2 Sheets-Sheet 1

Ryuji Sato,
INVENTOR.

BY Victor J. Evans,
ATTORNEY.

WITNESS: J B White

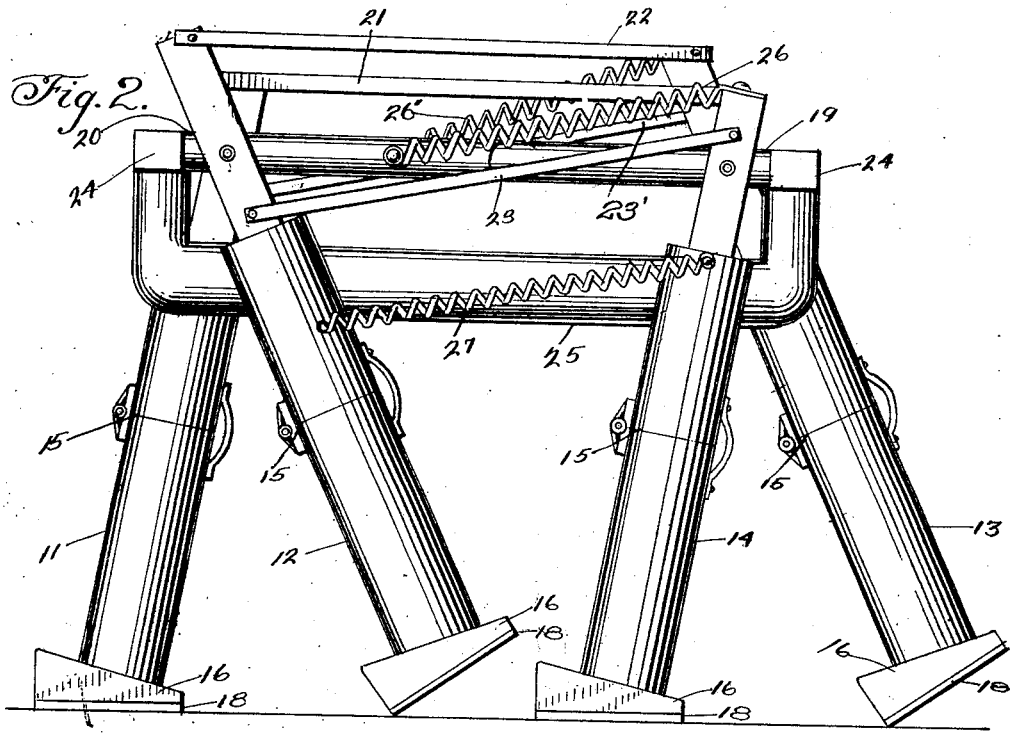

Patented Sept. 7, 1926.

1,599,290

UNITED STATES PATENT OFFICE.

RYUJI SATO, OF NEW YORK, N. Y.

WALKING TOY.

Application filed April 30, 1923. Serial No. 635,730.

This invention relates to walking animals or toys and is an improvement over my Patent No. 1,506,670, in which I am coinventor.

The principal object of the invention is to provide a walking animal with a mechanism whereby a continuous pull given to a cord connected to the animal, will cause the same to walk realistically upon a flat surface.

Another object of the invention is the provision of an animal toy, the body of which is weighted so as to bring the feet or tread members into firm contact with the surface upon which it walks, and whereby one rear leg and one opposite front leg act as a fulcrum for advancing the toy when pulling upon the cord attached thereto.

A further object is to provide a walking animal with suitable legs and having feet provided with heel portions which act as fulcrums when the legs are in a forward position, and gripping surfaces on the feet for engagement with the ground when the legs are in a rearward position.

A still further object is the provision of a walking animal which is simple in construction, cheap of manufacture, and highly efficient and amusing for the purpose intended.

With these and other objects in view, the invention resides in the certain novel construction, combination and arrangement of parts, the essential features of which are hereinafter fully described in the specification, are pointed out in the appended claims, and illustrated in the accompanying drawings, in which:—

Figure 2 is a similar view with the covering removed.

Figure 3 is a top plan view of the same.

Like characters of reference refer to like parts in all the views.

Figure 1:
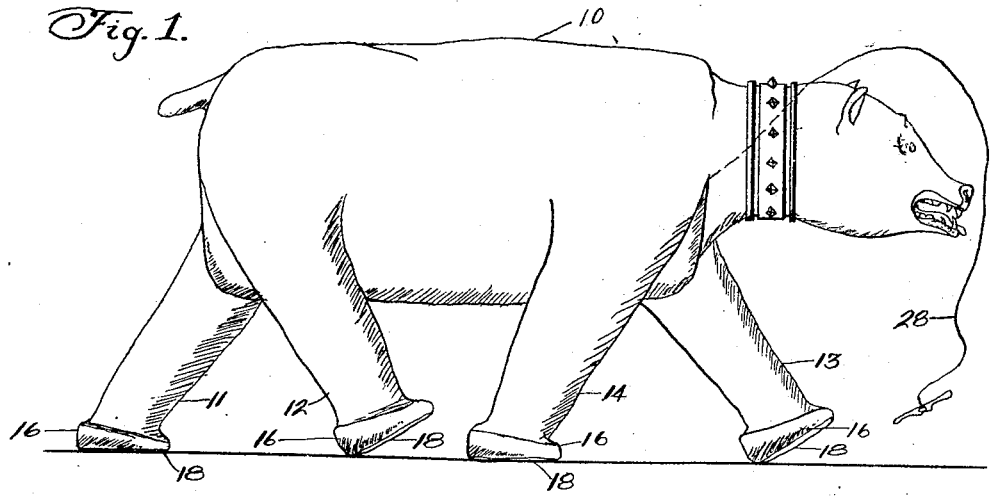
Figure 1 is a side elevation of my improved animal toy in its entirety.
Figure 4:
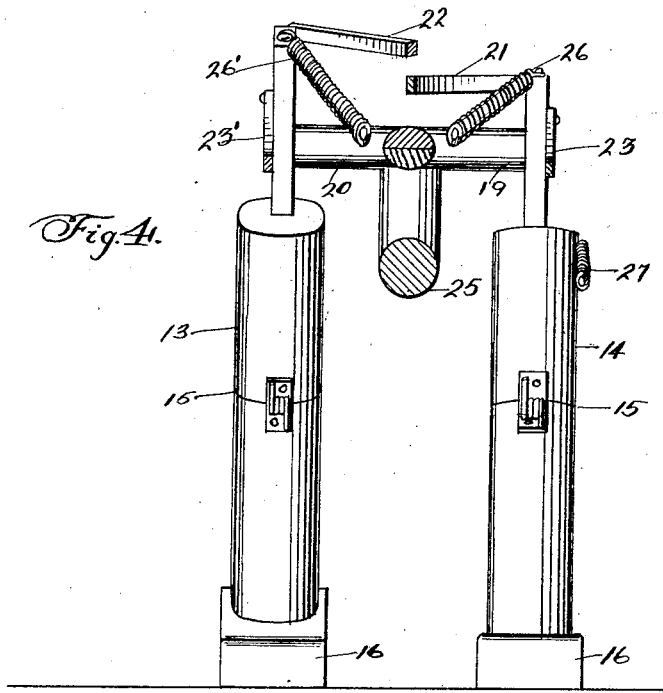
Figure 4 is a transverse sectional view taken on the line 4—4 of Figure 3.

Referring more particularly to the drawings, the numeral 10 represents a covering of material which may be given the shape of any desired animal, and in the present instance the same is shown as representing a bear. The material is preferably flexible so as to permit the free movement of the legs at the joints during the walking operation of the animal or figure.

The animal is shown as having the usual four legs consisting of rear leg bars 11 and 12, and front leg bars 13 and 14 respectively, each leg bar being provided with a spring hinged knee joint 15, the hinges being arranged on the back of the leg bars as shown in Figure 2 of the drawings. The leg bars terminate at one end in a foot 16, tapering from the heel portion to the toe portion for a purpose to be presently described. Each foot 16 is provided with a gripping surface 18, such as rubber, for engagement with the ground when the legs are in their rearward position.

The supporting frame to which the leg bars are connected is shown as comprising two bars 19 and 20 which extend diagonally through the length of the animal forming an X in plan view. The leg bars 11 and 14 are pivoted at opposite ends of the bar 19 while the leg bars 12 and 13 are similarly spaced on the bar 20. The leg bars 11 and 14 are connected to each other by means of a link 21, while the leg bars 12 and 13 are connected by a link 22. Links 23 and 23' connect each front leg with the respective rear leg bar, the point of connection with the front legs 13 and 14 being above the pivot, and the point of connection with the rear legs 11 and 12 being below the pivot. It will thus be seen that the legs are arranged in pairs, one front leg and the opposite rear leg constituting a pair. The frame also includes weighted rods 24 arranged transversely of the toy at the front and rear thereof, the said rods being rigidly connected with the ends of the cross bars 19 and 20. Suspended from these rods 24 and disposed longitudinally and centrally of the toy is a weight 25, and together with the rods 24 serve to perfectly balance the toy to prevent the accidental tipping over of the same, and also serve to bring the feet 16 into firm contact with the surface upon which the animal may rest. Contractile springs 26 and 26' have one end secured to the top of the front leg bars 13 and 14 respectively, and the other end connected with the frame bars 19 and 20. Connecting the right leg bars 12 and 14 below their pivotal connection with the frame is a contractile spring 27 of a greater strength than the spring 26. This spring 27 will draw the right legs 12 and 14 together when in their normal position, thereby separating the left legs 11 and 13.

In operation, we shall presume that the right legs are together as shown in Figure 1 and the left legs separated. In this position the heel of the rear right leg bar 12 and the heel of the left front leg bar 13 are in contact with the ground and stepping in a forward direction, and the leg bars 11 and 14 are in a position of a finished step and about to be moved forward, the gripping surface 18 of the foot being in contact with the ground. We shall now presume that a pull is given the manipulating cord 28 which rocks the structure on the legs 12 and 13 tending to lift the structure to permit the legs 11 and 14 to clear the ground. The legs 11 and 14 are broken at their joints during this movement but the joints automatically close when the structure reaches the highest point of its rocking movement as the legs swing forward, thereby moving the legs 11 and 14 through the operation of the several connecting links and springs, to the position previously assumed by the legs 12 and 13. Upon the forward movement of the legs, it will be noted that the joint 15 will be broken by reason of the surface 18 jamming the ground upon its tendency to move forward due to the forward rocking movement given the forwardly extending leg bars. This will give the animal a life-like appearance upon the successive movement of the leg bars. When pulling the toy by the string 28, the force of the pull is at about forty-five degree angle, and if desired, the pull may be from opposite sides as the sets of leg bars are respectively operated.

While there has been shown and described what I consider to be the preferred form of my invention, it is to be understood that changes, alterations, and modifications as come within the claims may be resorted to when desired.

What is claimed as new is:—

1. A walking toy animal comprising a frame, pairs of legs pivotally supported from said frame, each leg comprising a pair of hingedly connected sections, each pair of legs constituting a front leg and a diagonally opposite rear leg, links connecting the legs of the respective pairs above their pivots, links connecting the front legs of each pair above their pivots with the rear legs of the other pair below their pivots, and springs having one of their ends fastened to the frame and their other ends to the respective front legs, substantially as and for the purpose specified.

2. A walking animal comprising a figure including a frame, pairs of pivoted legs supported from said frame to swing therefrom, each leg constituting two sections hingedly connected together, each pair of legs including a front leg and a diagonally opposite rear leg, means operable when the toy is pulled to cause the legs of the respective pairs to move in the same direction, said means including links connecting the front and rear legs on the respective sides of the frame above the pivot of one leg and below the pivot of the other leg, each of said legs provided at its base with a friction strip, the joints of said legs adapted to be broken upon the forward movement of said legs, and cross bars connecting the tops of the legs of the respective pairs of legs.

3. A walking toy comprising a frame, pairs of legs pivotally supported from said frame, each leg including a pair of hingedly connected sections, the front leg of one side, and the rear leg of the diagonally opposite side constituting a pair, a link connecting the legs of each pair above their pivotal connection, yieldable means connecting the front legs of each pair with a portion of the frame, and a second link connecting the front leg of one pair above its pivot with the respective rear leg of the other pair below its pivot, whereby the legs of each pair are adapted to move simultaneously in the same direction.

4. A walking toy comprising a frame, pairs of legs pivotally supported from said frame, the front leg of each side, and the rear leg of the opposite side constituting a pair, a link connecting the legs of each pair above their pivotal connection, yieldable means connecting the front legs of each pair with a portion of the frame, and a second link connecting the front leg of one pair above its pivot with the respective rear leg of the other pair below its pivot, whereby the legs of each pair are adapted to move simultaneously in the same direction, each of said legs being jointed and provided at their lower extremities with feet having a substantially wedge-shaped friction surface.

In testimony whereof I have affixed my signature.

RYUJI SATO.